United States Patent [19]

Nelson

[11] Patent Number: 4,479,425
[45] Date of Patent: Oct. 30, 1984

[54] FRUIT CUTTER AND JUICER

[75] Inventor: Stewart C. Nelson, Forest Hills, N.Y.

[73] Assignee: Automatic Orange Juicer Corp., Forest Hills, N.Y.

[21] Appl. No.: 522,310

[22] PCT Filed: Jan. 24, 1983

[86] PCT No.: PCT/US83/00111
§ 371 Date: Jan. 24, 1983
§ 102(e) Date: Jan. 24, 1983

[51] Int. Cl.³ .............................................. A23N 1/00
[52] U.S. Cl. .................................... 99/507; 83/856;
83/874; 99/508; 99/509; 100/110; 100/213
[58] Field of Search ......................... 99/495, 501–510,
99/513, 537, 538; 100/104, 110, 116, 117, 121,
213; 83/423, 856, 857, 858, 105, 425, 870, 874

[56] References Cited

U.S. PATENT DOCUMENTS

| | | | |
|---|---|---|---|
| 1,888,528 | 11/1932 | Faulds | 99/502 |
| 2,065,271 | 12/1936 | Faulds | 99/502 |
| 2,199,876 | 5/1940 | Brown | 99/502 |
| 2,667,118 | 1/1954 | Nelson | 99/495 X |
| 3,139,126 | 6/1964 | Fromm et al. | 99/504 |
| 4,088,070 | 5/1978 | Montagroni et al. | 99/509 |

Primary Examiner—Timothy F. Simone
Attorney, Agent, or Firm—McAulay, Fields, Fisher, Goldstein & Nissen

[57] ABSTRACT

A cutter to halve citrus fruit in an automatic citrus fruit juicing machine is described. The advance is the sloping of cutting knife (2) and its supporting cam pedestal (3) at an angle of 45° to 80° to the horizontal. Fruit is fed to the knife (2) via a sloped chute (1) and the cut fruit, after passing over the cam pedestal (3), where the fruit gradually and fully opens, is placed on a mechanism for expressing the juice. Other portions of the automatic juicer are, generally, as described in the prior art.

8 Claims, 3 Drawing Figures

FRUIT CUTTER AND JUICER

FIELD OF THE INVENTION

The present invention is directed to apparatus for automatically obtaining juice from citrus fruits, particularly oranges. Apparatus of this type is generally well known and is employed both in commercial juicing operations and in food serving establishments where juice is fresh squeezed for the consumer.

In all such operations, it is necessary that the citrus fruit, particularly oranges, be fed to a surface where a cut surface of the citrus fruit is exposed, for example by halving the fruit, and then squeezing the cut pieces so as to extract the juice, without removing the undesirable flavor components from the rind or peel. The juice which has been expressed from the pieces is then recovered, while the rinds are discarded.

Many patents have described the type of machinery generally used in accordance with the present invention. For example, an overall system for fruit juice extraction is shown in Matthews, U.S. Pat. No. 2,273,618 and U.S. Pat. No. 2,311,565 in the name of Talbert G. Nelson. Each describes a system where oranges, for example, are cut into halves, the halves advanced, cut surface downward, over stationary male press elements and then squeezed by cup-like female press elements which are moved down axially to interact with the male press elements. When the female press elements are retracted, the rinds are ejected, while the juice from the citrus fruit is recovered.

Similar machines and operations are described, for example, in U.S. Pat. No. 2,629,317, Nelson; U.S. Pat. No. 2,572,286, Smith; U.S. Pat. No. 2,413,866, Du Lamey; U.S. Pat. No. 2,531,026, Cadella; U.S. Pat. No. 3,185,072, Rickard; U.S. Pat. No. 2,199,876, Brown; and U.S. Pat. No. 4,088,070, Montagroni et al. The referenced patents employ knives for cutting the citrus fruit, the knives generally being of the rotating blade, horizontal blade, or vertical blade types. With the vertical and horizontal blades, in particular, a mechanism is employed for forcing the citrus fruit to be cut over the blade.

It has been found that none of these blades perform totally adequately when the fruit to be cut has softened, a frequent condition.

BRIEF DESCRIPTION OF THE INVENTION

As indicated, in an automatic citrus juice juicing machine, the citrus fruit which is to be expressed from the fruit is frequently obtained from a fruit which is not firm, but which is in one way of varying degrees of softness. If this softness is not taken into account during severing or halving of the fruit, then the juice obtained is not of the high quality desired and frequently all of the juice contained within the fruit is not obtained.

When soft fruit is to be cut, an improperly angled knife can cause the fruit to collapse before cutting begins. Under these circumstances, one may express some of the undesirable materials from the rind and, additionally, the orange half which is obtained can never be properly placed within the squeezing mechanism to obtain the desired expressing operation. Either some of the flesh never has the juice expressed from it, additional undesirable materials are pressed from the rind, or both. These problems are particularly severe with horizontal and vertical knives particularly employed in the prior art, as illustrated, for example, in the aforereferenced Matthews patent, U.S. Pat. No. 2,723,618, where a vertical blade is employed. This vertical blade is the type normally used in present commercial machines.

The problem is not solved through use of the rotating knives of some of the other patents referred to, as control is lacking.

In accordance with the present invention, it has been found that even softened fruit can be adequately and accurately severed employing a knife which is sloped. The slope involves angling the blade of the cutter at between 45° and 80° from the horizontal. The cut citrus fruit sections are then forced along cam surfaces to the squeezing mechanism. Because of the slope of the knife blade, it is also possible to slope the cam surfaces, onto which the halves are forced, so as to provide better control in locating the severed pieces of the citrus fruit onto the squeezing mechanism.

DETAILED DESCRIPTION OF THE INVENTION

Figure 1:
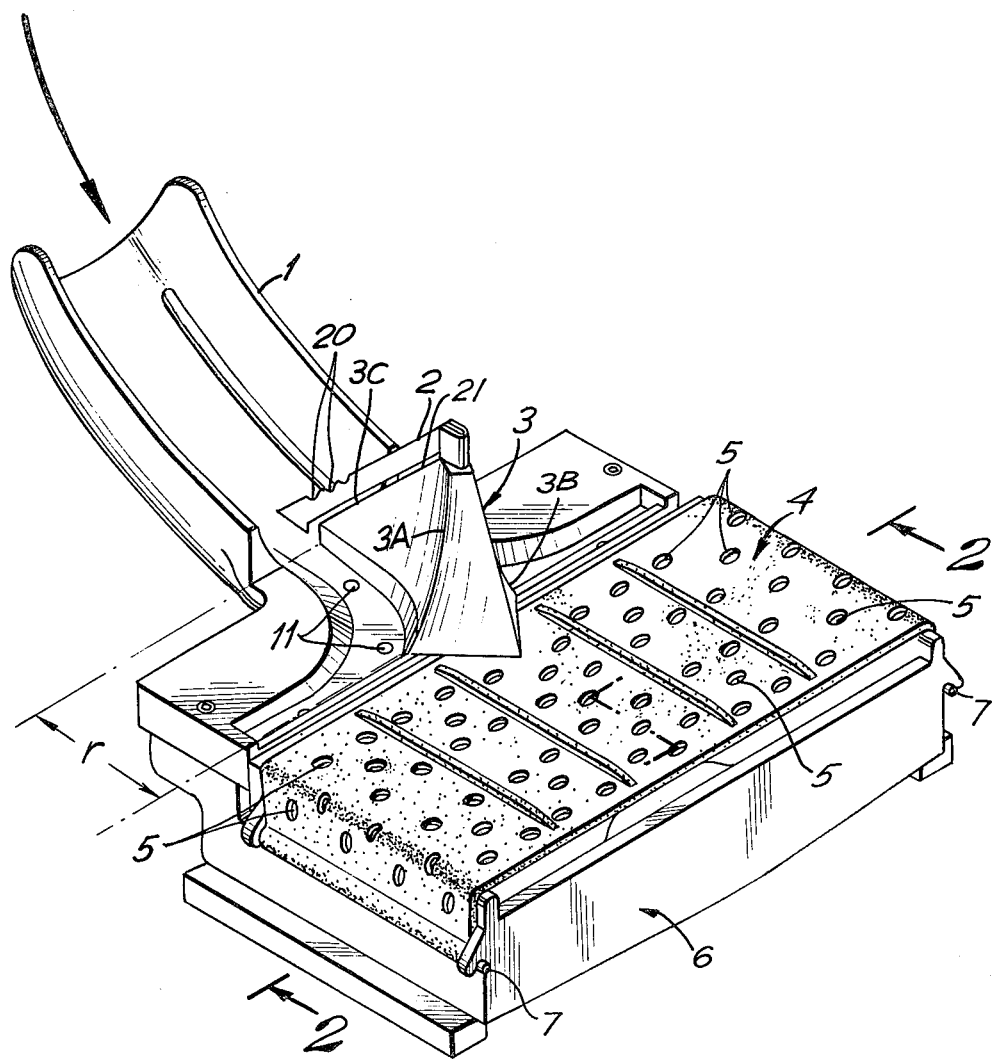
FIG. 1 is a perspective view of the sloped cutting knife and cam pedestal of the present invention, in combination with a feed chute and portion of a juice expressing mechanism useful in combination with the knife and cam pedestal.

Referring to the drawings, and particularly FIG. 1, a portion of a fruit juice extractor, particularly the cutter, cam separator, and a portion of the expressing mechanism is illustrated. The remainder of the system can be as illustrated in previously referenced Matthews U.S. Pat. No. 2,723,618, the remainder of that disclosure being herein incorporated by reference. It should be recognized, however, that the use of the invention as described herein should not be restricted to the remaining mechanism and structure of the Matthews patent, that mechanism and structure being provided merely as illustrative of structure and mechanism which can be employed in accordance with the present invention.

Specifically, FIG. 1 shows a chute 1 through which the citrus fruit, particularly oranges, are fed to be halved. They are forced against the sloped, or inclined, knife 2 which is attached to the cam pedestal 3. From the cam pedestal 3, the now-sliced fruit is fed, cut side down, to the top surface of the rubber sheeting 4. As illustrated, the rubber sheeting 4 is provided with a plurality of perforations 5 through which juice expressed from the citrus fruit passes.

As shown, the rubber sheet 4 is attached to a base structure 6 and is stretched to a generally taut condition via spindles 7.

Figure 2:
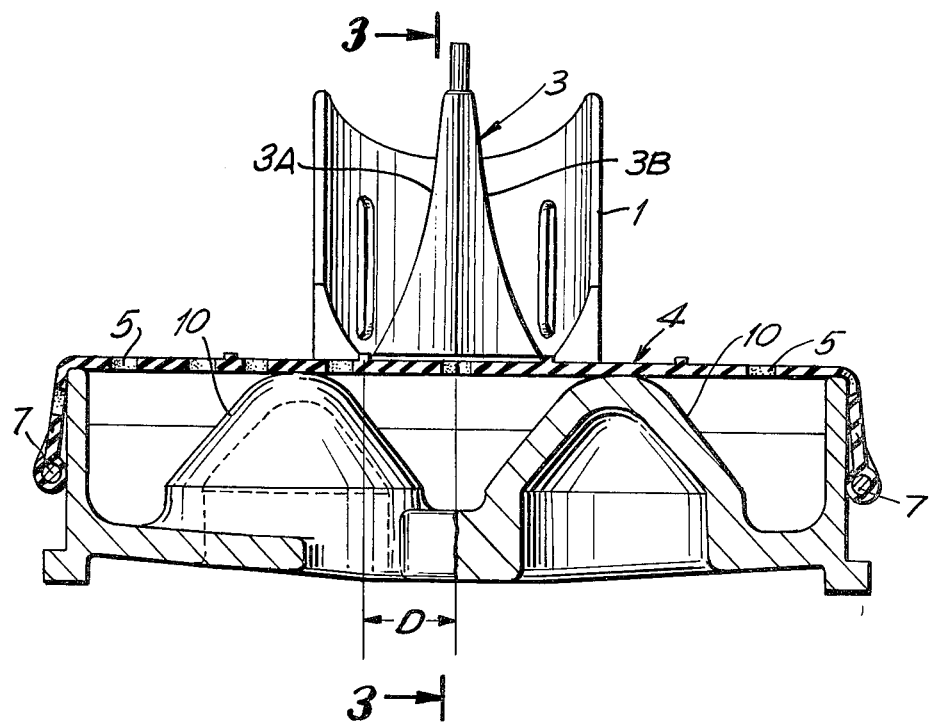
FIG. 2 is a sectional view along the line 2—2 of FIG. 1.
Figure 3:
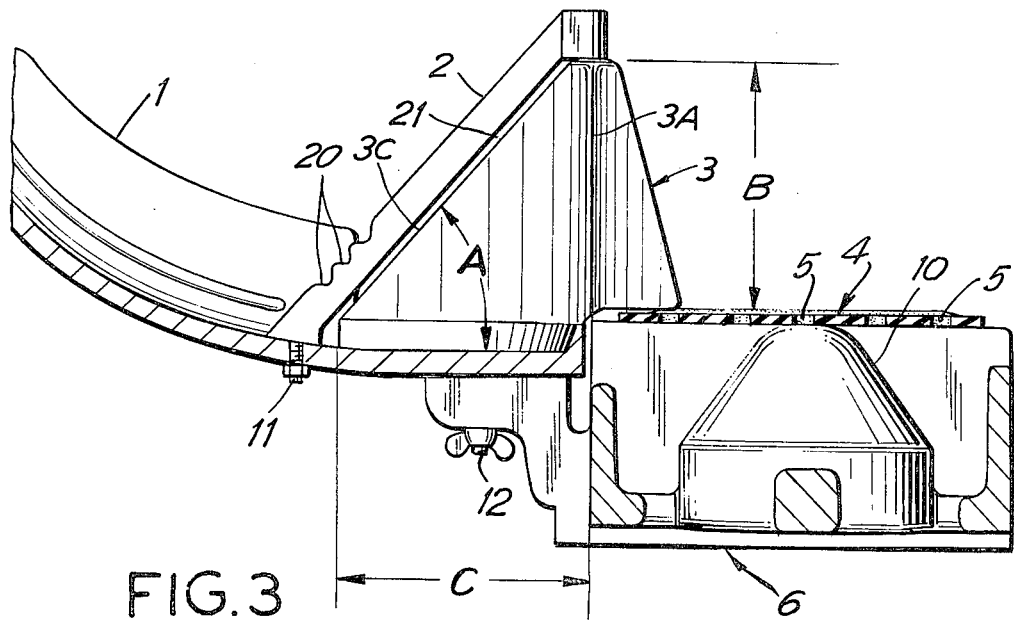
FIG. 3 is a sectional view along the line 3—3 of FIG. 2.

As shown in FIG. 2, the base 6 includes male cone members 10. The sliced fruit is placed on the rubber sheet 4 immediately above the cones 10 to be acted on by female press members (not shown).

As illustrated, the cam pedestal 3 and sloped knife 2 are shown as being attached by bolt members 11 and 12 to the chute 1 and base member 6, respectively. Any method for attaching the sloped knife 2 and cam pedestal 3 to the chute 1 and base member 6 which provides a firm attachment can be employed.

The critical facet of the present invention is the angle A at which the sloped knife 2 or leading edge of the cam pedestal 3 is presented in the structure. As indicated, the sloping of the knife 2 is accomplished in order to prevent friction and crushing of the citrus fruit being halved, particularly when soft fruit is employed. In accordance with the present invention, the angle A should be between 45° and 80°, preferably between 45° and 60°, most preferably at 45°.

Additionally, the long, compound angle of the cam pedestal allows the proper spreading of soft fruit before squeezing. In the prior art, the cam surface is relatively short and the cut fruit, particularly when it is soft, may not have sufficient distance in which to fully and gradually open. This prior art structure presents problems in moving the cut fruit from the cutter to the squeezing mechanism. These problems are eliminated by the cam pedestal 3 of the present invention. To accomplish the long, compound angle, the height B of the cam pedestal 3, the length C of the cam pedestal 3, and the half width D of the cam pedestal 3, should have an approximate ratio of 1:1:0.5. Further, the radius of curvature C of each cam face 3A and 3B should be gradual and steady.

The sloped knife 2, as illustrated, is provided with serrations 20, which aid in initiating cutting of the fruit to be halved. As illustrated, these serrations are on the bottom portion of the sloped knife 2, nearest the chute 1. While this is the preferred construction, the serrations may be omitted entirely, or may be placed along the entire leading surface of the slope knifed 2.

In operation, a piece of citrus fruit, such as an orange, is fed through the curved chute 1 to the leading surface of the sloped knife 2. It is then forced across this knife so as to be halved by a mechanism (not shown, but as illustrated in the Matthews patent), and continued movement of the mechanism for forcing the citrus fruit against the sloped knife 2 causes the halves of the fruit to be moved along the surfaces 3A and 3B of the cam pedestal. The sloping of the cam pedestal aids in assuring placement of these cut halves in the proper position on the rubber sheet 4. Because the expressing of the juice from the cut halves, the removal of the juice from the base member 6, and the discarding of the rinds form no part of the present invention, they are not illustrated, specifically.

In order to provide for proper support of the sloped knife 2, it should parallel the leading edge 3C of the cam pedestal. As illustrated, however, a small space 21 is left between this leading edge 3C of the cam pedestal and the rear face of the sloped knife 2. This allows for a small amount of flexing of the knife during cutting of the fruit and aids in the cutting operation, again, particularly when soft fruit is employed.

While specific embodiments of the invention have been shown and described, the invention should not be considered as limited to the specific illustrations, but only as limited by the appended claims.

I claim:

1. In a citrus fruit juice extractor having means for feeding whole citrus fruit to the extractor, means for cutting the fruit, means for expressing the juice from the fruit, means for recovering the expressed juice, and means for discarding the rind of the fruit, the improvement which comprises a chute for feeding individual pieces of fruit against a knife blade, said knife blade being supported on a cam pedestal, the leading edge of the knife blade and the leading edge of the cam pedestal being angled at from 45° to 80° relative to the horizontal, said cam pedestal acting to assure placement of the cut fruit onto said means for expressing the juice from the fruit.

2. The improvement of claim 1 wherein the angle of slope is from 45° to 60°.

3. The improvement of claim 2 wherein the angle of slope is 45°.

4. The improvement of claim 1 wherein a small space is maintained between the trailing edge of the knife blade and the leading edge of the cam pedestal.

5. The improvement of claim 1 wherein the leading edge of the knife blade is serrated.

6. The improvement of claim 5 wherein the serrations are on the portion of the knife closest to the feed chute.

7. The improvement of claim 1 wherein the ratio of the height, length, and half-width of the cam pedestal is approximately 1:1:0.5.

8. The improvement of claim 1 wherein the radius of curvature of each face of the cam pedestal is gradual and steady.

* * * * *